Jan. 12, 1965 W. D. WADE 3,165,278
LUMINOUS HAND CRANK FOR A FISHING REEL
Filed Aug. 6, 1962
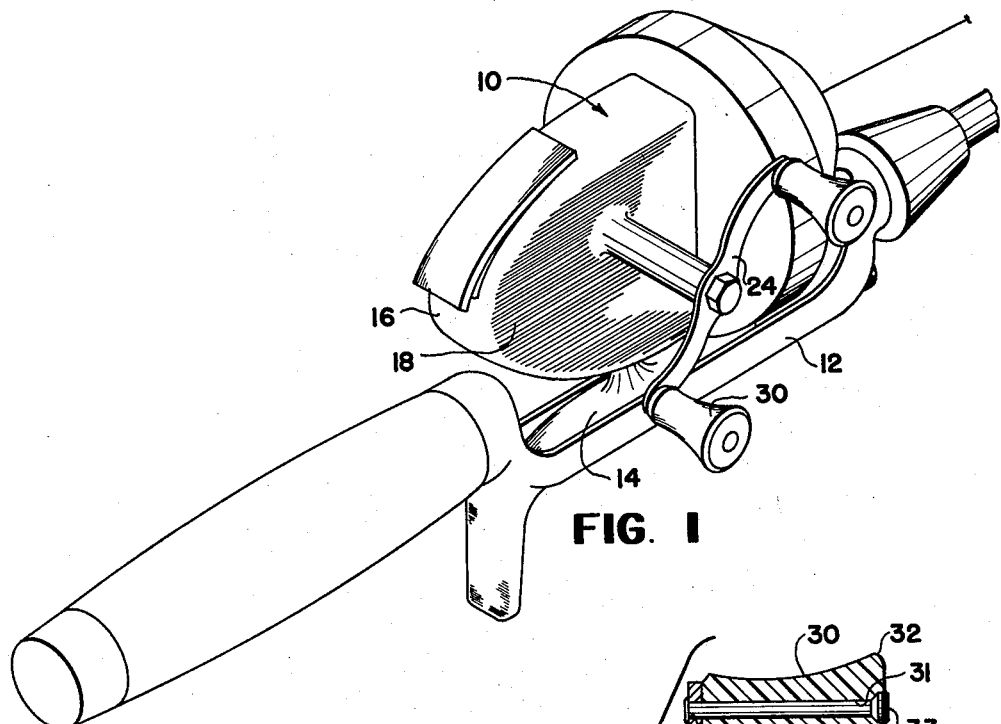
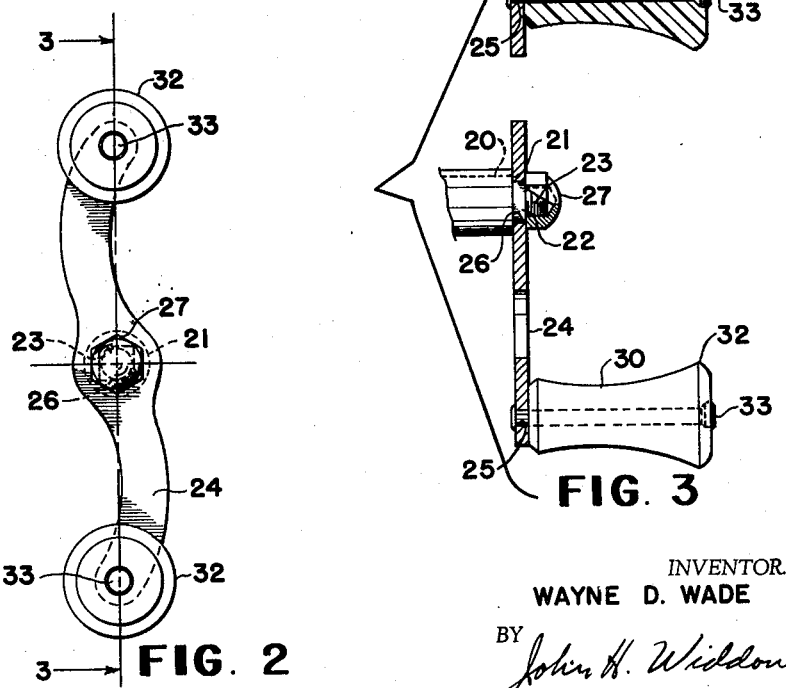
INVENTOR.
WAYNE D. WADE
BY John H. Widdowson
ATTORNEY United States Patent Office 3,165,278
Patented Jan. 12, 1965

3,165,278
LUMINOUS HAND CRANK FOR A FISHING REEL
Wayne D. Wade, % Kopy Kraft, P.O. Box 789,
El Dorado, Kans.
Filed Aug. 6, 1962, Ser. No. 214,925
3 Claims. (Cl. 242—84.1)

This invention relates to fishing. In a more specific aspect this invention relates to handle means for fishing reels especially handle means which can be seen in the dark. In a still more specific aspect this invention relates to a fishing reel particularly adapted for night fishing. In yet a more specific aspect this invention relates to a fishing reel provided with a glowing handle means that enables the fisherman to locate the fishing reel in the darkness and also produce a visual signal of the presence of a fish on the end of the fishing line.

Fishing during the nighttime has become a very popular sport. The nocturnal feeding habits of the fish make fishing during the nighttime the logical and most desirable and productive time to engage in fishing. Fishing in the darkness however presents many problems. Fishing equipment momentarily laid down becomes difficult to detect and find in the darkness. Further some satisfactory signal is needed to indicate the presence of a fish nibbling or running with the bait on the end of the fishing line. The abovementioned difficulties are greatly exaggerated if the fisherman uses more than a single fishing pole as is permissible under the fish and game laws in most states. Finding a misplaced fishing pole in the darkness, particularly if the fishing laws of the state prohibit the use of a light on the water, is very difficult. Groping for the rod in the darkness may result in injury to the fisherman since there is likely to be the usual fishing equipment such as fish hooks, gaff hooks and the like in the immediate vicinity of one fishing on a float, dock, or boat.

The prior art fishing rods are usually provided with an audio signal means for detecting line being drawn off the reel, namely mechanism that produces a clicking noise. This audio signal has not been satisfactory since it may not be detected by the fisherman if the distance between the reel and the fisherman is considerable, the fisherman has defective hearing, or there are many noisy background sounds such as waves lapping, wind blowing, etc. Therefore, the presence of a fish on the end of a line may go undetected by the fisherman if he does not hear the audio signal and he cannot see it in the darkness. An even more serious objection to the aforementioned audio signal is that it causes a drag on the line as the line is drawn off the reel. The habits of fish vary, however it is common for a fish contemplating taking the bait to grasp the bait loosely in its mouth, carry it some distance and then stop and devour the bait. The fish ordinarily does not become hooked until he devours the bait. If the drag caused by the clicking mechanism of the reel is present the fish may sense it and be scared away before it devours the bait. Consequently the fish may be lost. Further another consequence of the inability of the fisherman to see and detect his fishing reel is that he may inadvertently knock the reel and rod into the water where it will sink and be lost.

I have invented a handle means particularly adapted for use on a fishing reel used for night fishing. It has a handle provided with a means for affixing it to a fishing reel. The handle is composed of a radiant material. The fishing reel combinaton of my invention is particularly suited for night fishing. It has a reel means having crank means. To the crank means is affixed the handle means of my invention. Preferably the handle means is made of a crystal clear plastic having a uniform dispersion of luminescent pigment material embedded therein. The radiant handle means enables the fisherman to visually detect the position and movement of the reel in the darkness.

The new fishing reel combination of my invention is a simple though effective and dependable device that overcomes the disadvantages of prior art fishing reels when used in night fishing. My new fishing reel apparatus enables the fisherman to visually observe and detect the position of the fishing rod in the darkest night. In fact the darker the night the more visible the phosphorescent handle becomes. My reel apparatus further enables the fisherman to detect the presence of a fish either nibbling or running with his line even though he might be fishing in a noisy environment some distance from the reel, or possibly have defective hearing. Very important the fisherman is able to detect the fish nibbling at or running with the bait without the necessity of applying an objectionable drag to the line with the clicker mechanism of the reel. Since the drag is not present the fish is more likely to be deceived thus enhancing the likelihood of it being hooked and landed. Since the fisherman can observe the position of his fishing reel at all times there is less likelihood of the reel being inadvertently dropped into the water or the fisherman becoming injured while groping for the rod in the darkness. Furthermore, if the fishing rod should inadvertently be dropped into the water, the glowing handle of the reel may facilitate the search for the rod thus enhancing the chances of its recovery.

It is an object of the present invention to provide a new fishing means.

It is another object of the present invention to provide a new fishing means particularly adapted for night fishing that does not impose an objectionable drag on the fishing line yet conveys a signal to the fisherman of any fish activity.

It is still another object of this invention to provide a fishing reel with a means to facilitate the location of the rod and reel in the darkness.

It is another object of the present invention to provide an accessory handle to adapt existing fishing reels for night fishing.

It is still another object of this invention to provide a new fishing reel that will convey a visual signal to the fisherman of a fish nibbling or running with the bait.

Other objects and advantages of the invention will be apparent to those skilled in the art from the disclosure set forth herein.

Drawings of preferred specific embodiments of the invention accompany and are a part hereof, and such are to be understood to not unduly limit the scope of the invention.

FIG. 1 is a perspective view of a preferred specific embodiment of the new fishing reel of my invention mounted on a conventional fishing rod.

FIG. 2 is a side elevation view of the crank means thereof, showing an end view of the preferred specific embodiment of the new handle means of my invention.

FIG. 3 is a view taken on line 3—3 of FIG. 2.

The following is a discussion and description of the new fishing reel structure of my invention made with reference to the drawings wherein the same reference numerals are used to indicate the same or similar parts and/or structure. The discussion and description is of preferred specific embodiments of the fishing reel structure of my invention, and it is to be understood that such is not to unduly limit the scope of my invention.

Referring now to the drawings, FIGS. 1–3, spinning reel 10 is a preferred specific embodiment of the fishing reel structure of my invention. The spinning reel 10 illustrated is particularly suited for night fishing and adapted to be attached to and used on a conventional spinning rod 12. The spinning reel has a base 14 that is adapted to be removably secured to a conventional spinning rod. A housing 16 is provided to enclose a conventional gear mechanism and a fishing line spool (not shown) commonly associated with a spinning reel. A portion of the housing 16 has flat upright parallel sides 18 which are rigidly connected to base 14. A horizontal shaft 20 operatively connected to reel 10 extends through one of the walls 18 of the housing with an end portion protruding beyond the walls 18. Shaft 20 is disposed perpendicularly to walls 18. The portion of the shaft extending beyond the side walls of the housing is provided with a radially flat abutment surface 21 that is perpendicular to the longitudinal axis of shaft 20. An intermediate non-circular portion 22 on the shaft extends longitudinally outwardly from the abutment surface 21. A threaded outer end portion 23 is provided on the extreme end of the shaft 20. A crank means is provided that is adapted to be attached to the end of shaft 20. This crank means includes a flat generally S-shaped element 24 having apertures 25 at each end and a non-circular aperture 26 in the center that is adapted to receive the non-circular portion 22 of the shaft. A threaded nut 27, adapted to engage the threaded end portion 23 of the shaft, is provided to secure the flat S-shaped element 24 to the shaft to turn therewith. Affixed to the ends of the flat S-shaped element 24 are large handle elements 30, which are made of any suitable material but which are preferably made solid of phosphorescent plastic. Each of these handles are provided with a longitudinally extending aperture 31 located in the center of the handle. At the outer end of the handle there is an enlarged and outwardly flared end portion 32. The handles of the crank means are designed to glow in the darkness. In order to make the handles glow the material of the handles must be such as to luminesce or radiate light. Any suitable luculent or transparent plastic or other material that will glow in the nighttime is suited for this purpose. Preferably, but not necessarily, the plastic consists of a polymerized and cured uniform mixture of lucid polystyrene and phosphorescent pigment material. The pigment material can conveniently be zinc sulfide and constituting five to ten percent of the mixture by weight. Headed pin means 33 that extend through each of said handle apertures and the end apertures of the S-shaped element are provided to affix the handle elements to the S-shaped element. The handle elements of the reel are preferably made relatively large so as to be more clearly visible in the darkness. I have found a handle 1½ to 3 times as large as the conventional handle works very well.

The fishing reel combination of my invention providing a reel with a luminous handle is applicable to all types of fishing reels in general. The handle is particularly well adapted to be applied to a spinning reel, since a spinning reel line does not become tangled on the spool, and makes for easy night fishing. Obviously, a tangled line would be very difficult to untangle in the darkness. It is also contemplated that handles on conventional fishing reels of all kinds could be replaced with luminescent handles of this invention thus adapting them also for night fishing.

In order to produce a handle for a fishing reel in accordance with my invention any type luminescent material or material that has the property of glowing in the darkness may be used to make the handle. It has been found particularly desirable that the handle be made of plastic by injection molding, potting, casting, or the like, the plastic being lucid or transparent. Generally, the less transparent the plastic, the less desirable it is for use as a handle since any degree of opaqueness will cause degradation in luminescence. For this reason, the use of other pigments with the luminescent pigment is generally not desirable. However, small amounts of soluble dyes and other coloring materials may be used to produce pastel daylight colors without serious effect on luminescence. Thermoplastics of the crystal clear type, such as polymethylmethacrylate, polystyrene, cellulose acetate, polyvinylchloride, polyvinylchloride-acetate copolymers, and the like are particularly suited for use as a handle material. Other plastics which can be used are polyethylene, polypropylene, polychlorotrifluoroethylene (Kel–F), some of the polyamides, polytetrafluorethylene (Teflon), etc. Thermosetting plastics can also be used.

A luminous pigment is uniformly dispersed in the plastic. Particularly suited are the phosphorescent pigments, especially the phosphorescent pigments which are synthetic inorganic chemicals which have the property of glowing in the dark after previous exposure to photochemical irradiation, for example, ultraviolet light, sunlight, daylight, ordinary room lighting, or certain other forms of radiant energy. This phosphorescent afterglow lasts from thirty minutes to ten to twelve hours or more depending on the pigment, after which it can be repeated again and again by renewed exposure of the pigment to light. It is important to remember that the visible glow of phosphorescent pigments is an actual emission of light which should not be confused with reflectivity. There are a number of synthetic inorganic phosphorescent pigments that can be used. They include the sulfides of zinc, cadmium, calcium, the tungstates of calcium, cadmium, magnesium, the molybdates of calcium, the silicates of zinc, and cadmium, the borates of zinc cadmium, the phosphates of cadium, mixtures thereof, and the like. I have found that zinc sulfide or calcium sulfide present in an amount of about five to ten weight percent uniformly dispersed in a clear plastic such as polystyrene is preferable. Pigments containing radioactive material such as radium may also be used to produce a glowing light.

If desired, an inert filler material that is luculent or translucent can be compounded with the plastic materials and the luminescent pigment to give the handle greater tensile strength, reduce cost and increase the toughness of the handle. Examples of suitable filler materials are aluminum oxide, glass cloth, glass fiber, asbestos mica, and the like. The filler materials are given for illustration purpose and are not to be considered as limitations.

While I have described and illustrated preferred embodiments of my invention, it is to be understood that the handle means and fishing reel combination disclosed can be made in other forms than described or suggested without departing from the spirit or scope of my invention.

What I claim is:

1. A fishing reel particularly suited for night fishing, comprising, a reel means including a crank means having a plastic handle means affixed to said crank means, said plastic of said handle means comprising a mixture of a luculent resin and a phosphorescent material, said handle means being phosphorescent and in use adapted to facilitate visual observation in darkness of the crank means.

2. A fishing reel particularly suited for night fishing, comprising, a reel means having a crank means, and a plastic handle means affixed to said crank means, said plastic of said handle means comprising, a mixture of a luculent resin and a luminescent material, said handle means being luminescent and in use adapted to facilitate visual observation in darkness.

3. The fishing reel of claim 1 wherein said plastic handle means is relatively large, and said plastic of said handle means is comprised of a polymerized and cured uniform mixture of luculent polystyrene and a phosphorescent pigment material, said pigment material being zinc sulfide and constituting five to ten percent of said mixture by weight, said handle element being of a large size and phosphorescent to facilitate visual observation in darkness.

References Cited in the file of this patent
UNITED STATES PATENTS

| | | |
|---|---|---|
| 630,632 | Smith | Aug. 8, 1899 |
| 1,147,269 | Rosenheim | July 20, 1915 |
| 2,027,053 | Maynes | Jan. 7, 1936 |
| 2,145,929 | Herman | Feb. 7, 1939 |
| 2,298,968 | Roberts et al. | Oct. 13, 1942 |
| 2,303,097 | Townsend et al. | Nov. 24, 1942 |
| 2,624,857 | Mager | Jan. 6, 1953 |
| 2,650,309 | Webb et al. | Aug. 25, 1953 |
| 2,770,907 | Sharer | Nov. 20, 1956 |